Sept. 18, 1945.  L. C. GOODALE  2,384,833
METHOD OF MAKING A LEAD-IN SEAL
Filed May 27, 1942
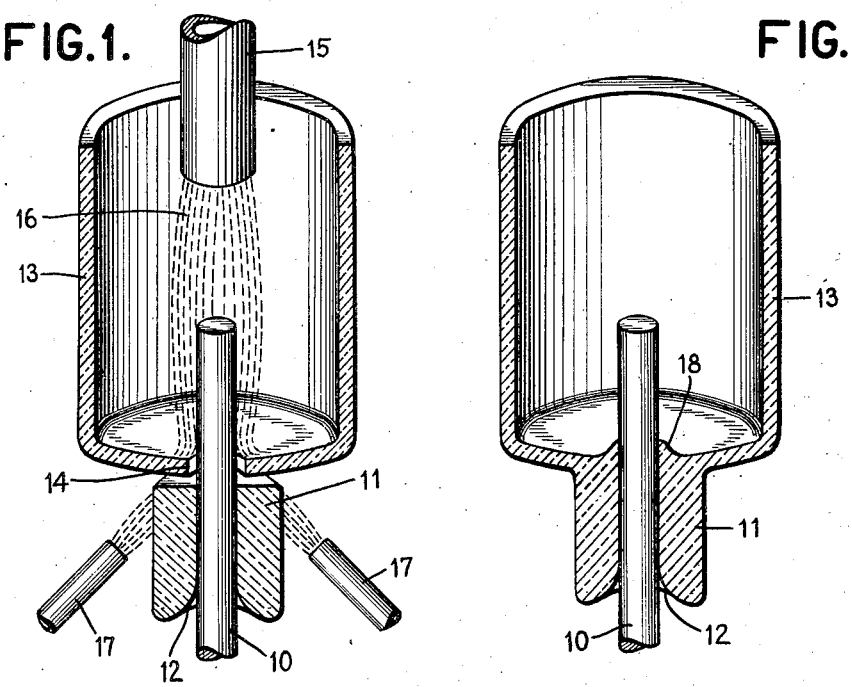

Patented Sept. 18, 1945

2,384,833

UNITED STATES PATENT OFFICE 2,384,833

METHOD OF MAKING LEAD-IN SEALS

Lynn C. Goodale, Newark, N. J., assignor to Federal Telephone and Radio Corporation, a corporation of Delaware Application May 27, 1942, Serial No. 444,665

5 Claims. (Cl. 49—81)

This invention relates to metal-to-glass seals and more particularly to sealing of electrode support rods through a glass envelope.

In sealing rods through glass envelopes it is common practice to mount the parts supported in a glass lathe and to rotate the parts or the fire used to soften the glass to distribute the heat evenly over the glass surface.

It is an object of my invention to seal a metal rod, such as a tungsten electrode supporting rod through a glass envelope without rotating the parts relative to the heating fire.

In accordance with a feature of my invention a hole or aperture is provided in a glass blank. The rod, previously beaded, is arranged to extend through the hold or aperture with the bead a little below the glass blank. Fire is then applied to the glass blank from the upper side, generally the side which will later form the inside of the tube. This fire is made to contact the glass of the blank simultaneously all around the edges of said aperture, to soften the glass of the blank so that it will fall away and seal to the bead on the rod. The fire may be in the form of a single large flame, or may be provided as a ring of flame about the aperture. Preferably, the glass bead is heated slightly during the sealing process, and after the glass is softened the rod is moved slightly up and down to puddle the glass and improve the seal.

A better understanding of my invention may be had from the particular description thereof made with reference to the accompanying drawing in which Fig. 1 is a sectional view of parts illustrating apparatus for practising the method of my invention;

Fig. 2 is a completed seal such as that of Fig. 1, and

Fig. 3 is a sectional view showing alternative apparatus for practising the invention.

In Fig. 1 is shown a rod 10, preferably of tungsten. On rod 10 is provided a glass bead 11 having at one end an invert as indicated at 12. This glass bead may be formed by first beading the glass with a tubular section or sleeve and then winding on soft glass forming it with invert at 12 by means of a graphite paddle or the like. The glass end-plate or cup is shown at 13 and has a hole 14 provided therein. This hole may be provided by stamping out the glass in a manner indicated in my copending application Ser. No. 339,-480, filed June 8, 1940, which issued as Patent No. 2,339,850 on Jan. 25, 1944. Although 13 is shown in this instance as being a cup shaped portion, it is clear that any desired form of glass plate or bulb may be used.

Rod 10 is inserted centrally through hole 14 to such a position that the bead 12 is arranged only slightly below the hole or aperture 14. These elements, of course, are held in place in a suitable jig, not shown, and the glass is then fired by flame from a burner nozzle shown at 15. The flame 16 from 15 is preferably quite large so that it extends down over the end of rod 10 and plays against the surface of plate 13 adjacent opening 14. This heating of the glass softens the plate all the way around hole 14 so that the softened glass tends to fall away and seal to bead 12. In order that the seal may be more readily formed, the bead 11 may be pre-heated by use of small fires 17, which are preferably maintained at a low enough temperature so as not to fuse bead 11 but merely to bring it to a high temperature.

Preferably while the glass is fused the tungsten rod 12 is moved back and forward slightly so as to puddle the melted glass and thereby form a better seal.

In Fig. 2 the completed seal made by the method demonstrated in Fig. 1 is shown diagrammatically. As will be noted, the glass from plate 13 had been completely fused with bead 11. Also, because of the movement of rod 10 back and forth, the glass also has sealed somewhat to the rod so as to produce the upward extending portion 18 of the glass within the seal.

It is clear that instead of using a single large flame to fire the glass, as shown in Fig. 1, the glass may be heated by means of small fires extending around the central rod 10. Such an arrangement is illustrated in Fig. 3. In this figure in place of a large burner 15 a ring burner 25 fed with gas by way of conduit 26 is shown.

Fires from burner 25 serve to heat the glass plate 13 through the openings or hole 14 in the same manner as did the flame 16, of Fig. 1. Also, in this figure a ring burner 27 is shown for pre-heating the glass bead instead of individual burners, such as shown in Fig. 1.

It is clear that the seal formed with the arrangement of Fig. 3 will be substantially the same as that formed in the case of Fig. 1.

While for the purposes of simplicity the sealing of only a single rod is shown, it is clear that the principles of my invention apply equally well to the sealing of a plurality of rods through any glass plate. In order to practice the method, when a plurality of rods is used, it is only necessary that the suitable jigs be provided to support all of these rods in apertures in the plate, and that individual fires be provided to fire the glass about each of said rods.

It is also clear that in accordance with my invention since the melting together of the glass parts is caused by the action of gravity, it is generally desirable to support the rod in a vertical position beneath the plate 13. By the use of the arrangement shown herein, the assembly of tubes may be greatly speeded up over the tubes assembled in accordance with prior art processes. By use of the method disclosed herein, no rotation of the part with respect to the flame is necessary during the sealing period. It is, therefore, clear that in a mass production of tubes, a continuous conveyor system could be worked out wherein the elements intermittently move into position under the fires for a period sufficient to cause fusing of the glass and completion of the seal.

It should be distinctly understood that while I have shown specific examples illustrating the method in accordance with my invention, other arrangements may be readily apparent to those skilled in the art. These examples are given merely by way of illustration and are not to be considered as defining or limiting the scope of my invention.

What I claim is:

1. The method of sealing a previously glass beaded rod through an aperture in a glass plate, comprising making an aperture in said glass plate larger than the cross section of the rod but smaller than that of the bead, positioning said rod substantially vertically through said aperture with the top of the glass bead slightly below and spaced from said aperture, and applying heat to said plate on the side away from said bead to soften the glass about said aperture so that it will drop onto and seal to said bead.

2. The method according to claim 1, further comprising heating said bead to a temperature below the fusing point while said heat is applied to said plate.

3. The method of sealing a conductor rod through a glass plate, which comprises forming a glass bead on said rod, making an aperture through said glass plate larger than the cross section of the rod but smaller than that of said bead, positioning said rod substantially vertically through said aperture with the top of the glass bead below and spaced from said aperture, and applying heat to the upper side of said plate simultaneously to several marginal portions symmetrically arranged about said aperture to soften the glass about said aperture so that it will drop onto and seal to the top of the said bead.

4. The method of sealing a conductor rod through a glass member which comprises sealing a glass bead to the rod, forming through said glass member an aperture larger than the cross section of the rod but smaller than that of the bead, positioning said rod substantially vertically through said aperture with the top of the glass bead slightly below and spaced from the marginal region of said aperture facing the top of the bead, applying heat to said member along the circumference of said aperture to soften the glass so that it will descend into contact with the bead, and continuing said application of heat to fuse said marginal region and the top of the bead together to form a seal.

5. A method of sealing a previously glass-beaded rod through a glass plate comprising making an aperture in said plate smaller than the cross section of the glass bead but larger than that of the rod, positioning said rod substantially vertically through said aperture with the top of the glass bead slightly below said aperture, applying heat to said plate on the side away from said bead to soften the glass about said aperture so that it will drop onto and seal to said bead, and moving said rod up and down relative to said glass plate while the glass plate is molten to puddle said glass.

LYNN C. GOODALE.